(12) United States Patent  
DeJonge et al.

(10) Patent No.: US 6,295,887 B1  
(45) Date of Patent: Oct. 2, 2001

(54) MINIATURIZED TRANSMISSION SHIFTER

(75) Inventors: Robert A. DeJonge, West Olive; Stephen D. Wexall, Grand Haven, both of MI (US)

(73) Assignee: Grand Haven Stamped Products, division of JSJ Corporation, Grand Haven, MI (US)

( * ) Notice: Subject to any disclaimer, the term of this patent is extended or adjusted under 35 U.S.C. 154(b) by 0 days.

(21) Appl. No.: 09/377,567

(22) Filed: Aug. 19, 1999

Related U.S. Application Data

(60) Provisional application No. 60/115,415, filed on Jan. 11, 1999.

(51) Int. Cl.$^7$ .............................. B60K 20/00; G05G 5/00; B06R 25/04; F16H 59/74

(52) U.S. Cl. .................. 74/473.3; 74/473.28; 74/483 K; 477/99; 70/248

(58) Field of Search ...................... 477/99, 96; 74/473.3, 74/473.31, 473.12, 473.21, 473.28, 335; 192/95, 219.5, 220.7, 34; 70/248, 247

(56) References Cited

U.S. PATENT DOCUMENTS

| Re. 34,064 | | 9/1992 | Tury et al. . | |
|---|---|---|---|---|
| 2,968,195 | * | 1/1961 | Edgley | 74/473.3 |
| 3,141,350 | | 7/1964 | Bevacqua et al. . | |
| 3,844,180 | * | 10/1974 | Williams et al. | 74/473.3 |
| 3,901,097 | * | 8/1975 | Williams et al. | 74/473.3 |

(List continued on next page.)

OTHER PUBLICATIONS

Exhibit A discloses a prior art shifter manufactured by Audi Corporation more than one year prior to filing the present application.

*Primary Examiner*—David A. Bucci
*Assistant Examiner*—Marcus Charles
(74) *Attorney, Agent, or Firm*—Price Heneveld Cooper DeWitt & Litton

(57) ABSTRACT

An apparatus is provided for shifting a vehicle transmission. The apparatus includes a miniaturized shifter having a base and having an elongated shift lever subassembly rotatably mounted on the base for movement between a plurality of gear positions. The shift lever subassembly is rotatable about an axis of rotation that extends parallel a length of the shift lever subassembly. A detent device includes an irregular surface defining gear positions on the base, and further includes a pawl on the shift lever subassembly that operably engages the irregular surface to prevent undesired rotational movement of the shift lever subassembly between at least some of the gear positions until the pawl is disengaged from the irregular surface. A feel positioner is also provided on the apparatus and includes an undulated surface separate from the irregular surface on the base, and further includes a spring-biased protrusion on the shift lever subassembly. The undulated surface has depressions accurately aligned with each of the gear positions and opposing ramps inclined toward a center of each depression. The spring-biased protrusion operably engages the undulated surface to provide a feel to a vehicle driver as the vehicle driver shifts the shift lever subassembly between gear positions, and further the arrangement is configured to bias the shift lever subassembly toward a center of each gear position. The arrangement requires that the shift lever subassembly must be manipulated by a vehicle operator both telescopingly and rotationally to select different ones of the gear positions. The apparatus further includes an ignition switch interlocked to the shifter to control removing the ignition key and to control moving the shifter until predetermined vehicle conditions are met, and further includes a vehicle electrical control circuit connected to an electromechanical device for selectively engaging the shifter to also control moving the shifter until predetermined vehicle conditions are met.

24 Claims, 12 Drawing Sheets

U.S. PATENT DOCUMENTS

| | | |
|---|---|---|
| 4,326,432 | 4/1982 | Miller . |
| 4,817,471 | 4/1989 | Tury . |
| 4,841,793 | 6/1989 | Leigh-Monstevens et al. . |
| 4,843,901 | 7/1989 | Peterson et al. . |
| 4,884,057 | 11/1989 | Leorat . |
| 4,922,769 | 5/1990 | Tury . |
| 4,980,668 | 12/1990 | Leigh-Monstevens . |
| 4,998,444 | 3/1991 | Mabee . |
| 5,014,038 | 5/1991 | Leigh-Monstevens et al. . |
| 5,035,158 | 7/1991 | Leigh-Monstevens . |
| 5,042,133 | 8/1991 | Peterson et al. . |
| 5,065,135 | 11/1991 | Leigh-Monstevens et al. . |
| 5,085,106 | 2/1992 | Bubnash . |
| 5,156,243 * | 10/1992 | Aoki et al. .......................... 74/335 X |
| 5,161,422 | 11/1992 | Suman et al. . |
| 5,197,344 | 3/1993 | Maier et al. . |
| 5,370,015 | 12/1994 | Moscatelli . |
| 5,415,056 | 5/1995 | Tabata et al. . |
| 5,528,953 * | 6/1996 | Steinle et al. ...................... 74/473 R |
| 5,566,778 | 10/1996 | Valier et al. . |
| 5,718,312 | 2/1998 | Osborn et al. . |
| 5,791,197 | 8/1998 | Rempinski et al. . |
| 5,884,528 | 3/1999 | Ludanek et al. . |
| 5,902,209 * | 5/1999 | Moody ................................... 477/99 |
| 5,954,179 * | 9/1999 | Osborn ............................. 192/219.5 |
| 5,957,001 | 9/1999 | Gualtieri et al. . |

* cited by examiner

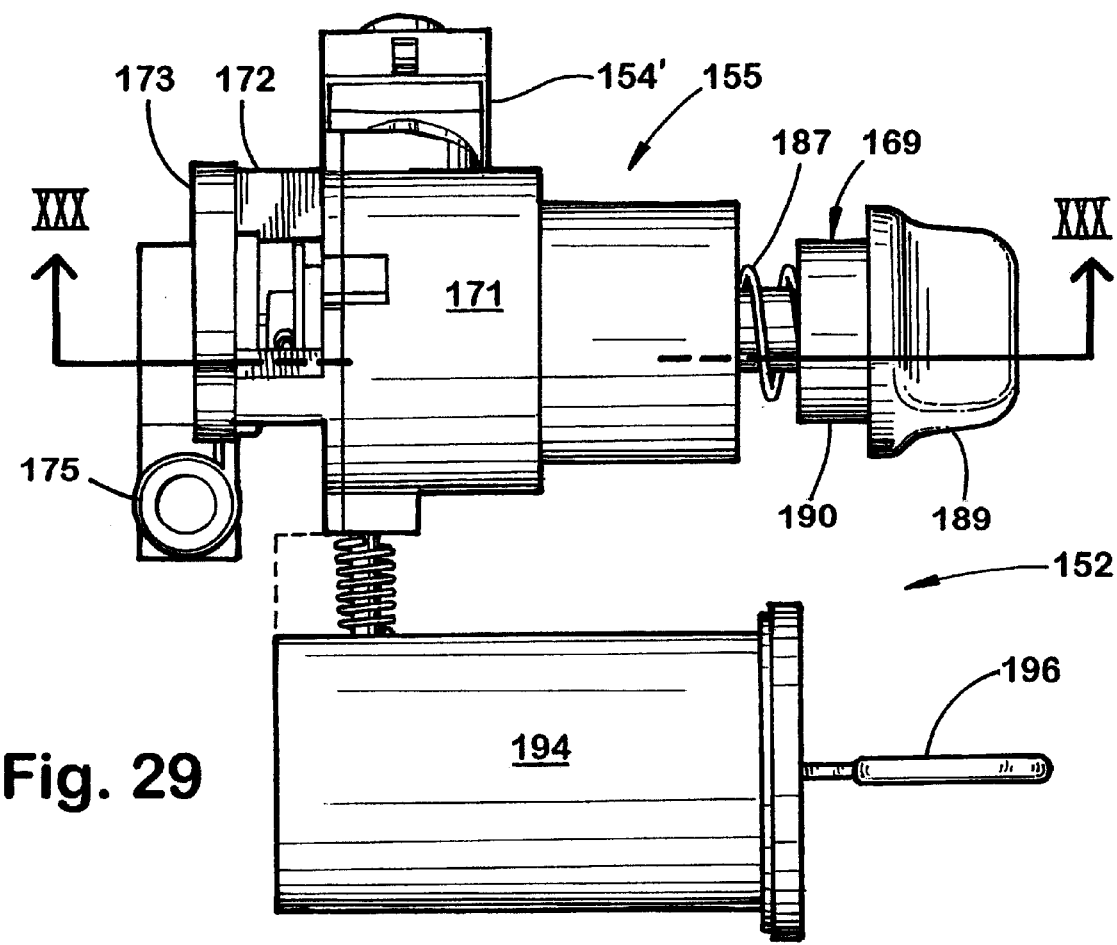
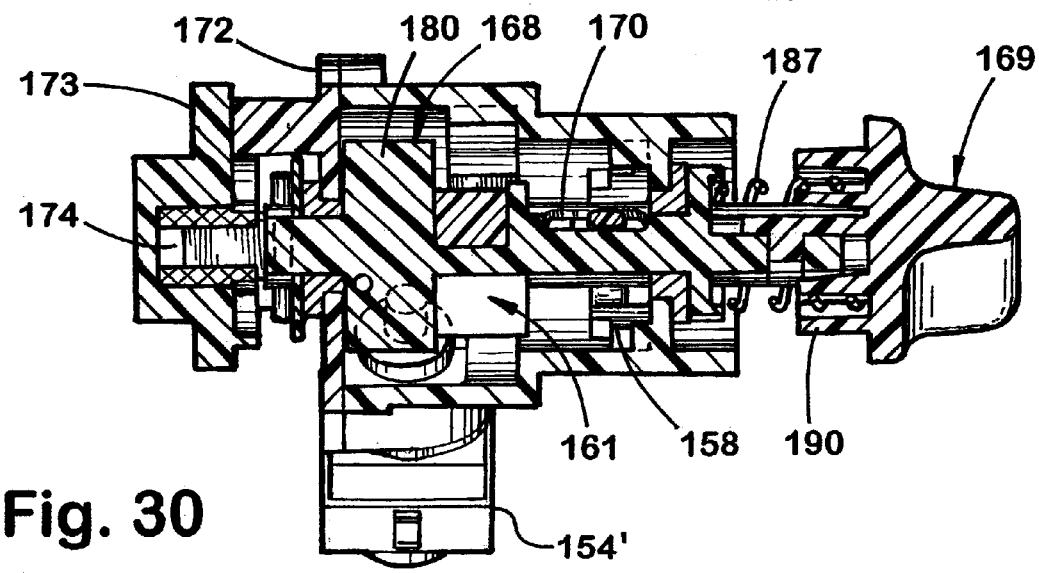
Fig. 29
Fig. 30

MINIATURIZED TRANSMISSION SHIFTER

CROSS REFERENCE TO APPLICATION UNDER 35 U.S.C. 119(e)

The present application claims priority under 35 U.S.C. 119(e) from provisional patent Application No. 60/115,415, filed Jan. 11, 1999, entitled Finger-Operated Transmission Shifting Systems and Methods.

BACKGROUND OF THE INVENTION

The present invention concerns miniaturized transmission shifters and shifting systems, and methods for shifting vehicle transmissions related to same.

More and more, manufacturers of modern vehicles are taking advantage of electronic devices and systems for controlling and operating vehicles. Further, manufacturers are maximizing interior space in the passenger compartments of vehicles, such as by minimizing the size of controls and devices within the passenger compartment, and further by optimizing the location of these devices. Consistent with this, some manufacturers are considering specifying "finger-operated" miniaturized controls for controlling shifting of vehicle transmissions, as opposed to traditional "hand-operated" shifters, such as the traditional shift levers that are mounted in floor consoles between front vehicle seats. However, as shifters are miniaturized, problems of misalignment of the miniaturized shift lever to selected gear positions can increase due to the small size of components. Further, any misalignment can quickly become critical, since gear positions are physically located closer together on a miniaturized shifter than on a more traditional "full sized" shifter. Also, the miniaturized components must be made to maintain a high level of function, durability, and security against theft despite their small size.

Further, there are safety concerns associated with a change to miniaturized components. Specifically, modern federal statutes require that shifting systems be constructed so that vehicle transmissions cannot be accidentally shifted into (or out of) certain gears until predetermined vehicle conditions are met. For example, traditional "hand-operated" shifters are designed so that, before a shift lever can be moved out of a park gear position, the brake pedal must be depressed, the ignition key must be in the ignition switch and in the "on" position, and a thumb-operated button must be depressed to move a pawl out of a park gear notch. Only then can the shift lever itself be moved. (For example, see U.S. Pat. No. 5,096,033.) Vehicle manufacturers often desire a mechanical interlock device or a positive physical interaction of components to provide the safety interlocks, as opposed to an interlock device that is solely electrically operated. However, the small size of miniaturized shifters can make mechanical and electromechanical interlocking devices for such shifters relatively more fragile.

Accordingly, a shifting arrangement is desired having the advantages of miniaturization and finger operation, but also that provides requisite safety features and that solves the above-identified disadvantages.

SUMMARY OF THE INVENTION

In one aspect of the present invention, an apparatus for shifting a vehicle transmission includes a shifter having a base adapted for attachment to a vehicle and having an elongated shift lever subassembly rotatably mounted on the base for movement between a plurality of gear positions. The shift lever subassembly is rotatably movable about an axis of rotation that extends parallel a length of the shift lever subassembly. The shift lever assembly includes a handle in-line with the axis that is rotatable with a dialing motion. A detent device is provided that includes an irregular surface with notches corresponding to the gear positions on one of the base and the shift lever subassembly, and further that includes a first protrusion on the other of the base and the shift lever subassembly. The first protrusion operably engages the irregular surface in a manner physically preventing undesired rotational movement of the shift lever subassembly between at least some of the gear positions until the first protrusion is axially moved and disengaged from the irregular surface. A feel positioner device includes an undulated surface separate from the irregular surface on one of the base and the shift lever assembly, and further includes a second protrusion on the other of the base and the shift lever subassembly. The undulated surface has depressions accurately aligned with each of the gear positions and further has well-defined opposing ramps inclined toward a center of each depression. The second protrusion operably engages the undulated surface to provide a feel to a vehicle driver as the vehicle driver shifts the shift lever subassembly between gear positions. The arrangement is further configured to bias the shift lever subassembly toward a center of each gear position.

In another aspect of the present invention, an apparatus for shifting a vehicle transmission includes a base defining an axis of rotation and having a circumferentially extending surface with radially extending notches therein defining a plurality of gear positions. A shift lever subassembly includes a lever support that extends parallel a length of the axis and that rotatably engages the base for rotation about the axis. The shift lever subassembly further includes a shift lever member that telescopingly engages the lever support but that is coupled to the lever support for rotation with the lever support. The shift lever member includes a pawl that extends radially from the shift lever member into engagement with the notches and includes a spring that telescopingly biases the shift lever member in a manner causing the pawl to move into engagement with the notches. The pawl positively engages the notches to prevent undesired rotational movement of the shift lever subassembly but the shift lever member is telescopingly movable on the lever support against a bias of the spring to disengage the pawl from the notches. By this arrangement, the shift lever subassembly must be manipulated by a vehicle operator both telescopingly and rotationally to select different ones of the gear positions.

In another aspect of the present invention, an apparatus for shifting a vehicle transmission includes a shifter having a base defining an axis of rotation and an elongated shift lever subassembly that extends parallel the axis and that is rotatably mounted on the base for movement between a plurality of gear positions. The shift lever subassembly includes a miniaturized knob in-line with the axis of rotation that is shaped to receive a person's fingers for rotational manipulation, and further includes a radially extending aperture. A detent device includes an irregular surface with notches corresponding to the plurality of gear positions on one of the base and the shift lever subassembly, and a first protrusion on the other of the base and the shift lever subassembly. The first protrusion operably engages the irregular surface to prevent undesired rotational movement of the shift lever subassembly between at least some of the gear positions. An ignition switch is attached to the base that is movable between an ignition-on, key-retained position and a key-released position. An ignition switch interlock device includes an extendable pin configured to extend into the aperture to prevent undesired rotation of the shift lever subassembly when the ignition switch is in the key-released position and to retract from the aperture when the ignition switch is in the ignition-on, key-retained position.

In another aspect of the present invention, an apparatus adapted to function with a vehicle control circuit for shifting a vehicle transmission includes a shifter having a base and a shift lever subassembly rotatably mounted on the base for movement about an axis of rotation between a plurality of gear positions. The shift lever subassembly includes a miniaturized knob in-line with the axis of rotation and that is shaped to receive a person's fingers for rotational manipulation. The shift lever subassembly further includes an enlarged section that rotates with the knob, the enlarged section including an aperture. A detent device includes an irregular surface with notches corresponding to the plurality of gear positions on one of the base and the shift lever subassembly, and a first protrusion on the other of the base and the shift lever subassembly. The first protrusion operably engages the irregular surface to prevent undesired rotational movement of the shift lever subassembly between at least some of the gear positions. A vehicle control circuit is provided, and an electromechanical interlock device including an electromagnetic coil is operably connected to the vehicle control circuit. The electromechanical device includes an extendable pin operably associated with the electromagnetic coil. The extendable pin is normally retracted and disengaged from the aperture but is configured to extend into the aperture when the shift lever subassembly is in a predetermined one of the gear positions and when the vehicle control circuit actuates the electromagnetic coil. The pin, when extended, prevents the shift lever subassembly from being moved from the one gear position until the vehicle control circuit retracts the pin and allows the shift lever subassembly to be rotated.

In another aspect, the present invention includes a shifter for connection to an electrical control circuit for shifting a transmission of a passenger vehicle. The passenger vehicle includes a passenger compartment and includes an instrument panel in the passenger compartment. The instrument panel has dense arrangements of instruments, gages, and controls mounted to structure in the instrument panel. A miniaturized shifter includes a base configured to be positioned in and supported in a compact space within a vehicle instrument panel, and includes a miniaturized shift lever subassembly pivotally mounted to the base. The miniaturized shifter is characteristically small in size such that a vehicle operator can only operate the miniaturized shifter with the operator's fingers and not with a palm or other body part. An interlock device includes an electromechanical device adapted for connection to the vehicle control circuit. The electromechanical device includes an extendable pin that is configured to move between a locking position where the extendable pin engages the miniaturized shifter to prevent movement until predetermined vehicle conditions are met and the control circuit actuates the electromechanical device. The extendable pin is also configured to move to an unlocked position where the extendable pin disengages from the miniaturized shifter to allow shifting by the operator.

In yet another aspect, the present invention includes a shifter adapted for connection to an electrical control circuit for shifting a transmission of a passenger vehicle. The passenger vehicle includes a passenger compartment and includes an instrument panel in the passenger compartment. The instrument panel has dense arrangements of instruments, gages, and controls mounted to structure in the instrument panel. A miniaturized shifter includes a base configured to be positioned in, attached to, and supported in a compact space within a vehicle instrument panel, and includes a miniaturized shift lever subassembly pivotally mounted to the base. The miniaturized shifter is characteristically small in size such that a vehicle operator can only operate the miniaturized shifter with the operator's fingers and not with a palm or other body part. A potentiometer is connected to the shift lever subassembly and is configured to generate a signal representative of a gear position of the shift lever. The potentiometer is adapted for connection to the vehicle control circuit.

These and other aspects, features, objects, and advantages of the present invention will become apparent to a person of ordinary skill upon reading the following description and claims together with reference to the accompanying drawings.

DESCRIPTION OF THE DRAWINGS

FIG. 29 is a top view of the shifter-and-ignition-switch assembly shown in FIG. 21;

FIG. 30 is a cross-sectional view taken along the line XXIX—XXIX in FIG. 29;

DETAILED DESCRIPTION OF THE PREFERRED EMBODIMENTS

Figure 1:
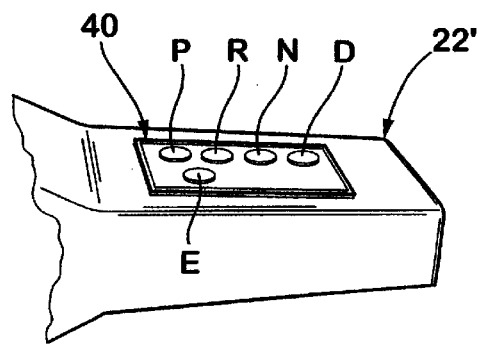
FIG. 1 is a perspective view of a finger-operated electrical input device mounted in a console.

A shift control apparatus for controlling shifting of a vehicle transmission includes an electrical circuit with a controller programmed to control and shift a vehicle transmission and a finger-operated electrical input device operably connected to the circuit. The term "miniaturized" and "finger-operated" electrical input device is used herein to mean a device that can be easily manipulated by a typical adult vehicle driver and is intended to be different than a traditional floor-mounted gear shift handle, which is grasped by a driver's hand (including their palm). The illustrated finger-operated electrical input devices of FIGS. 1–19 include at least one pushbutton or a slide button or a touch pad, and further include a controller programmed to require, in at least some gear positions, at least two inputs from the input devices before the controller outputs an output signal causing the transmission to shift. As illustrated below, the control module can include several "gear-related," driver-selectable pushbuttons or switches corresponding to different gear positions, such as park (P), reverse (R), neutral (N), and drive (D). The finger-operated electrical control device can also include function-related pushbuttons (or slide members) corresponding to shift feel, such as a hard-clutched shift or a smooth-clutched shift, or pushbuttons (or slide members) that provide an enabling function that enables the other pushbuttons (or slide members). Also, several different locations of the input devices are contemplated, such as on a vehicle instrument panel, on a steering wheel, or on a console between front vehicle seats.

In order to better understand the surprising and unexpected results achieved by the present invention, it is necessary to understand a traditional shifter arrangement. The illustrated shift control apparatus 20 (FIGS. 18 and 19) includes a traditional shifter 21 mounted in a console 22. The shifter 21 includes a base 23 attached to a vehicle floor pan 24 and a shift lever 25 that extends upwardly through a top panel 26 of the console 22. The shift lever 25 includes a bottom pivot 27 pivoted to the base 23, a post 28, and a handle 29. A detent plate 30 is attached to the base 23 and includes detent notches P, R, N, D, and L, or includes other gear positions 3, 2, and 1. A pawl 31 on the shift lever 25 is positioned to operably engage the detent notches. The pawl 31 is operably mechanically connected to a pushbutton switch 33 on the handle 29 via an internal flexible straw 32. In the illustrated conventional arrangement, an electromechanical interlock device 34 is connected to the base 23 or the shift lever 25 and is constructed to physically block movement of the pawl (or the shift lever 25) out of the park position P unless predetermined vehicle conditions are met. It is noted that most existing vehicles that include detent notches P, R, N, and D have a ramped surface 35 that permits an operator to slide the shift lever 25 from the reverse position R to the neutral position N and to flat surface 36 that permits the driver to slide the shift lever 25 into the drive position D without moving the pawl 31. Thus, in some gear positions, the shift lever 25 can be shifted by simply pushing the shift lever 25 toward a desired gear position, while in other gear positions (e.g., when moving into or out of park) the pawl must be operated before the shift lever 25 can be moved.

Figure 2:
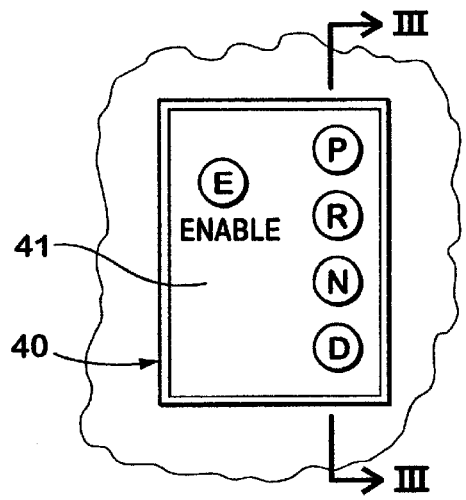
FIG. 2 is a plan view of the shifter arrangement shown in FIG. 1, including an electrical input device having pushbuttons for controlling shifting of a vehicle transmission, the module being connected to an instrument panel of a vehicle.
Figure 3:
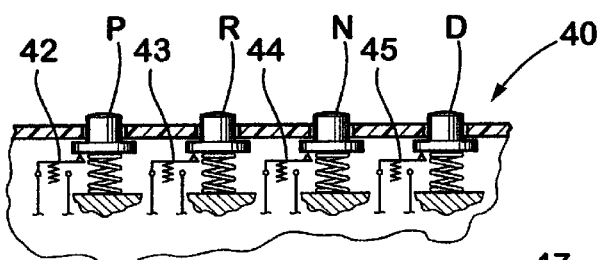
FIG. 3 is a cross-sectional view taken along the line III—III in FIG. 2.
Figure 4:
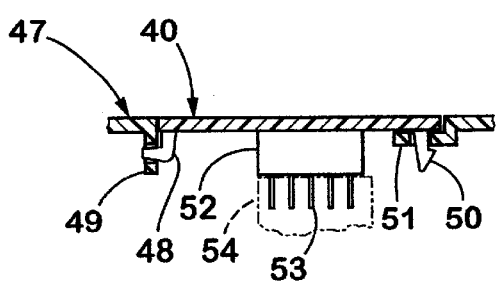
FIG. 4 is a side view of FIG. 2.
Figure 5:
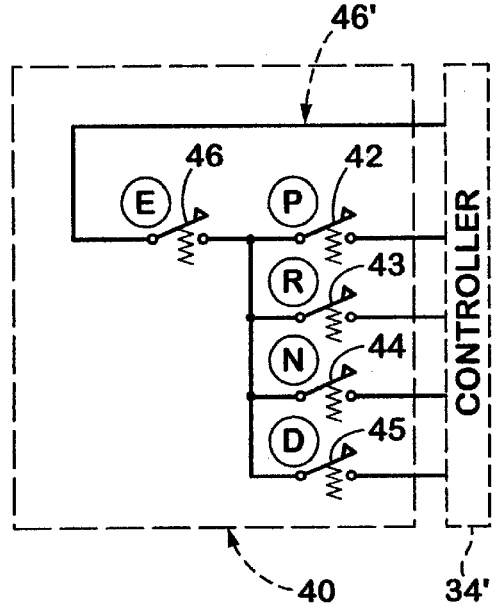
FIG. 5 and FIG. 5A are schematic views of an electrical circuit including the pushbuttons shown in FIG. 2.

The shifter arrangement of FIGS. 1–5 includes a finger-operated electrical input device or control module 40 (FIG. 2) having a body 41 and a plurality of pushbuttons E, P, R, N, and D operably mounted in the body 41 and connected to switches 42–46 in the electrical circuit 46° (FIG. 5). The pushbutton E is an enabling pushbutton and must be depressed to close (i.e., actuate) switch 46 before power is supplied to the other pushbuttons. The pushbuttons P, R, N, and D correspond to gear positions in a vehicle transmission and, when depressed, they close switches 42–45, respectively, to send a "shift-actuating" signal to the controller causing the controller to shift the vehicle transmission to a selected gear position. The circuit 46' is constructed to only send the shift-actuating signal if the enabling pushbutton E is depressed. This is intended to meet an industry adopted standard where a vehicle can only be shifted upon two different actions, which in this case is the actuation of both the enabling pushbutton and one of the corresponding gear pushbuttons. It is specifically contemplated that a timer could be associated with the enabling pushbutton E that would allow the enabling pushbutton E to be depressed and released prior to depressing the gear-selected pushbutton. For example, this could be accomplished by placing a timer on the enabling pushbutton E itself or by placing a timer in the circuit or in the controller, which timer would hold the enabling pushbutton E open for a period of time after the enabling pushbutton E was depressed. In FIG. 1, the input device 40 is shown as mounted in a top panel of a console 22'. FIG. 3 shows the top surface or tip of each pushbutton P, R, N, and D as having distinct and differently shaped contours so that a driver can see and feel the different gear positions without having to look at the pushbuttons.

Figure 5A:
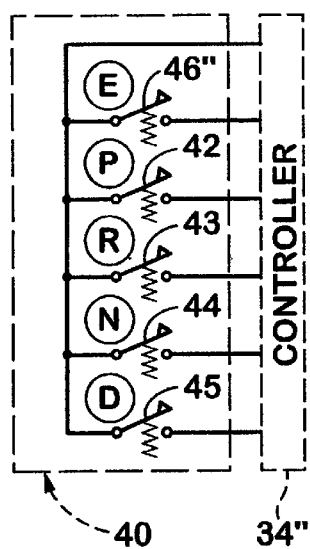

The circuit shown in FIG. 5A is similar to the circuit of FIG. 5 except that the enabling switch 46" is shown to be attached in parallel to the other switches 42–45. In the circuit of FIG. 5A, the controller 34' is programmed to require that the enabling switch 46" be actuated for certain gear movements (such as to enable shifting from park position P to another gear, or to enable shifting from neutral position N to reverse position R) and is programmed so that the enabling switch 46" does not need to be actuated for other gear shifting (such as from neutral position N to drive position D, or from neutral position N to reverse position R).

The body 41 is configured to snap into position in a vehicle instrument panel 47 and to automatically electrically connect to a mating electrical connector upon mechanical attachment. Specifically, the body 41 includes a lower flange 48 configured to fit into a mating apertured flange 49, and further includes a top hooked flange 50 configured to snap into a mating apertured flange 51. The body 41 is configured to be assembled to the instrument panel 47 with a single motion, with the electrical connector 52 containing the blade-like electrical contacts 53 for switches 42–45 being configured to matingly slidingly engage a receiving electrical connector 54 on the instrument panel 47.

A modified control module 40A (FIGS. 6 and 7) includes components similar to control module 40, including a body 41A and switches 42A–45A related to gear positions P, R, N, and D that are connected to circuit 46A'. However, instead of having an enabling switch 46, the controller 34A' of circuit 46A' is programmed to require a double click of the pushbuttons before the controller 34A' will react and send out a signal causing shifting of the vehicle transmission. Much like a computer mouse on a home computer, the controller 34A' is programmed to require that the double-click action occur within a predetermined time period, such as within a fraction of a second. The control module 40A further includes an additional switch 55 connected to a pushbutton B that can be depressed to cause the controller 34A' to shift with a hard-clutched shift, which is often preferred by younger drivers or in sport cars. The control module 40A further includes an additional switch 56 connected to a pushbutton S that can be depressed to cause the controller 34A' to shift with a soft-clutched shift, which is often preferred by older drivers or by drivers when driving in winter or under slippery road conditions.

As a person in this art will recognize, each of the above shifter arrangements can be connected to existing control circuitry and structure known in the art. For example, in FIGS. 5, 7, and 8, the circuits 46' (or 46A') are interconnected with a BITSI circuit 57 and/or a park-lock circuit 58. A BITSI circuit and associated structure is shown and fully described in U.S. Pat. No. 5,211,271 (to Osborn et al.), and also a park-lock circuit and associated structure is shown and fully described in U.S. Pat. No. 5,677,658 (to Osborn et al.), which two disclosures are incorporated herein in their entirety. Accordingly, these structures do not need to be disclosed in this document for a complete understanding of the present invention.

A modified control module 40B (FIG. 9) includes a plurality of pushbuttons represented by pushbutton 60. The pushbutton 60 is operably mounted on a body 41B to slide in a first direction 61 along a face of the body 41B, and thereafter to depress in a second direction 62 into the body 41B. By this double action, the single pushbutton 60 requires a two-step motion in order to actuate the pushbutton 60. Thus, this pushbutton 60 eliminates the need to have an "enabling" pushbutton like pushbutton E, yet still satisfies the requirement of a two-step action to prevent accidental shifting. The switches 42B and 46B are both connected to the pushbutton 60, with the switch 42B being positioned to be closed when the pushbutton 60 is slid in the first direction 61, and with the switch 46B being positioned to be closed when the pushbutton 60 is depressed in the second direction 62. The pushbuttons P, R, N, and D each are similarly connected to switches 46 and to switches 42–45, respectively. Notably, it is contemplated that the two-step mechanical motion may be sufficient to satisfy the need for a two-step sequence that eliminates accidental shifting, such that the need for switch 46 may be totally eliminated.

A modified pushbutton 60C (FIG. 10) is similar to pushbutton 60 in that it requires two separate movements. However, pushbutton 60C requires rotation in a first direction 61C before it can be depressed in a second direction 62C. The switch 43C is positioned on the body 41C so that it is closed when pushbutton 60C is rotated, and the switch 46C is positioned on the body 41C so that it is closed when pushbutton 60C is depressed.

Figure 11:
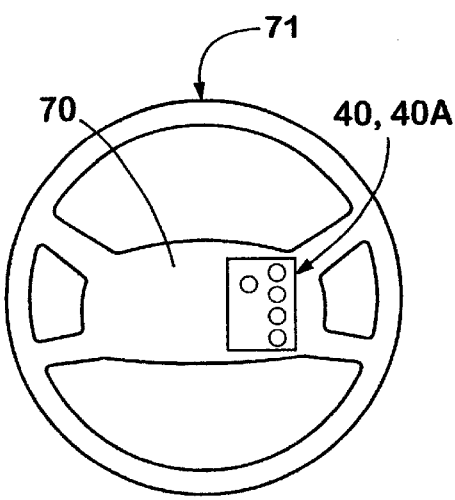
FIG. 11 is a front view of a steering wheel having a pushbutton shifter arrangement thereon similar to the pushbutton arrangement shown in FIG. 6.

An arrangement is shown in FIG. 11 that includes a control module 40 (or control module 40A) attached to a central section 70 of a steering wheel 71. The arrangement allows control over shifting off of controls located on the steering wheel 71. Due to the double action required by the control module 40, there is no fear of accidental shifting of the vehicle transmission.

Figure 12:
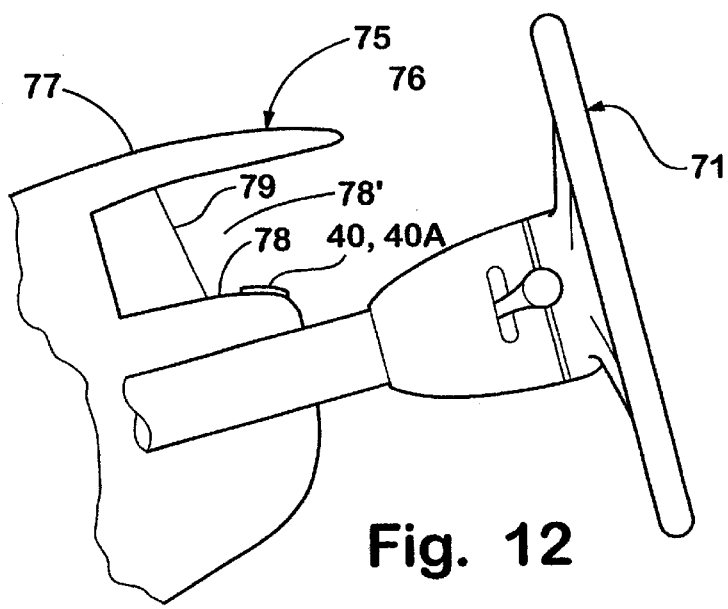
FIG. 12 is a side view of a steering wheel and an instrument panel, the instrument panel having a shelf located below the vehicle instrument gages and including a pushbutton shifter arrangement on the shelf.

Yet another arrangement is shown in FIG. 12, where an instrument panel 75 includes an upper shelf 76 with a top surface 77 that extends toward a vehicle front window, and further includes a lower shelf 78 spaced from the upper shelf 76 by a viewing area 78'. Vehicle gages, such as the vehicle speedometer, odometer, gas gage, tachometer, temperature gages, and the like, are positioned at 79 behind the viewing area 78'. A control module 40 (or control module 40A) having pushbuttons is attached to the lower shelf 78 near a front edge thereof, so that it is easily accessible.

Figure 13:
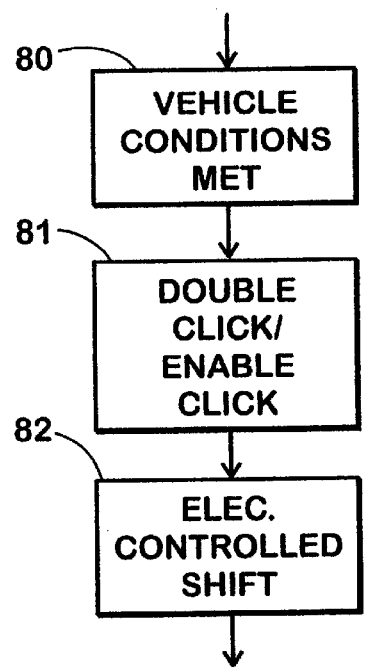
FIG. 13 is a flow diagram showing a method of shifting utilizing a pushbutton shifter arrangement.

FIG. 13 shows a method where predetermined vehicle conditions are met in a first step 80, such as a brake pedal being depressed, or a key being in an ignition switch and in the "on" position, or the like. A circuit is then activated in step 81 by double clicking on a switch or by enabling the switch and then clicking it. Thereafter, in step 82, a controller sends a signal to a transmission to shift gears.

Figure 6:
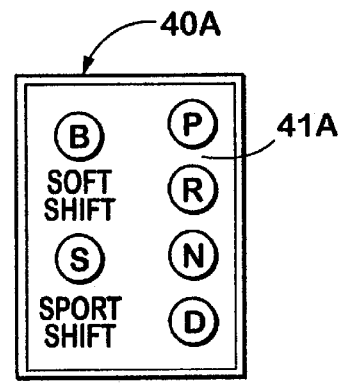
FIG. 6 is a front view of a shifter arrangement including an electrical module having pushbuttons for controlling shifting of a vehicle transmission.
Figure 7:
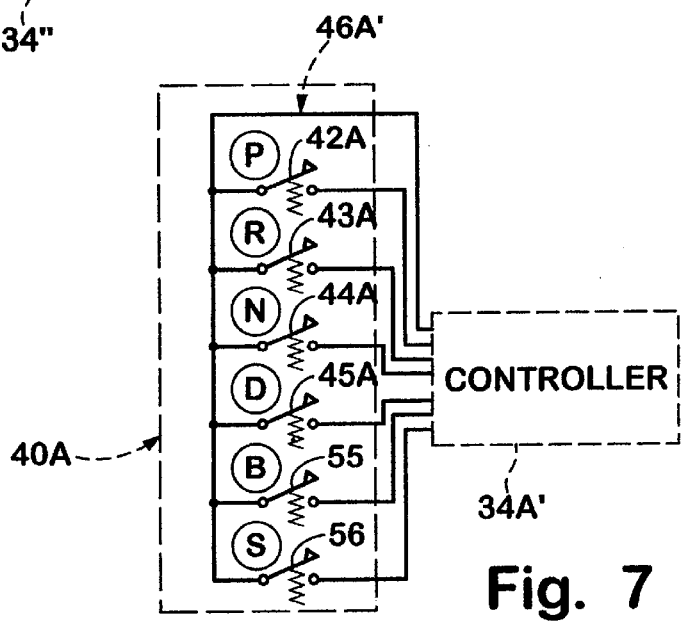
FIG. 7 is a schematic view of an electrical circuit including the pushbuttons shown in FIG. 6.
Figure 8:
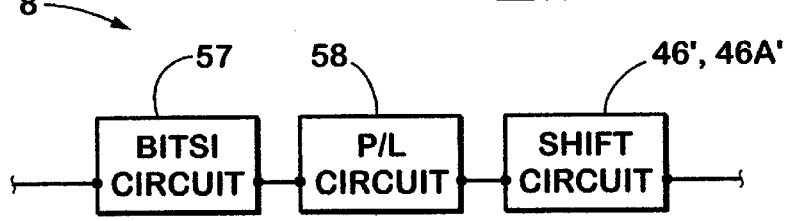
FIG. 8 is a schematic view of an electrical circuit including the pushbutton shifter arrangements of either FIG. 3 or FIG. 6, and further including a steering wheel/park/lock circuit and a brake-ignition-transmission-shift-interlock (BITSI) circuit.
Figure 9:
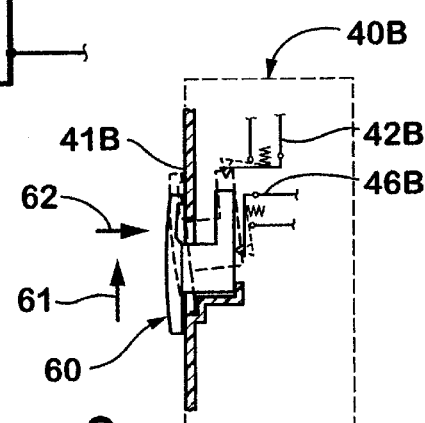
FIG. 9 is a side cross-sectional view including a two-motion pushbutton and a circuit associated therewith.
Figure 14:
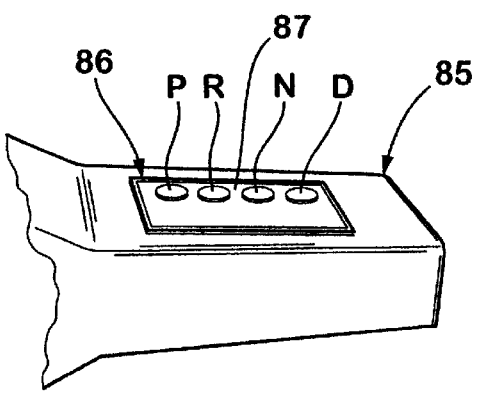
FIG. 14 is a perspective view of a console incorporating a modified pushbutton arrangement of the present invention.
Figure 15:
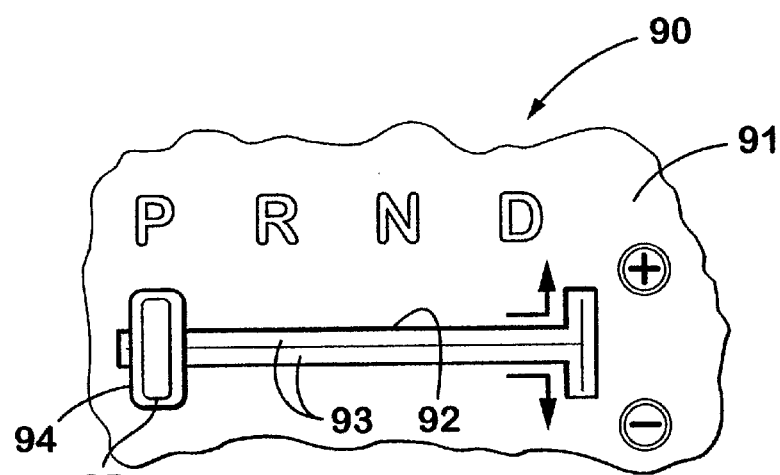
FIG. 15 is a plan view of a slide button arrangement embodying the present invention.
Figure 16:
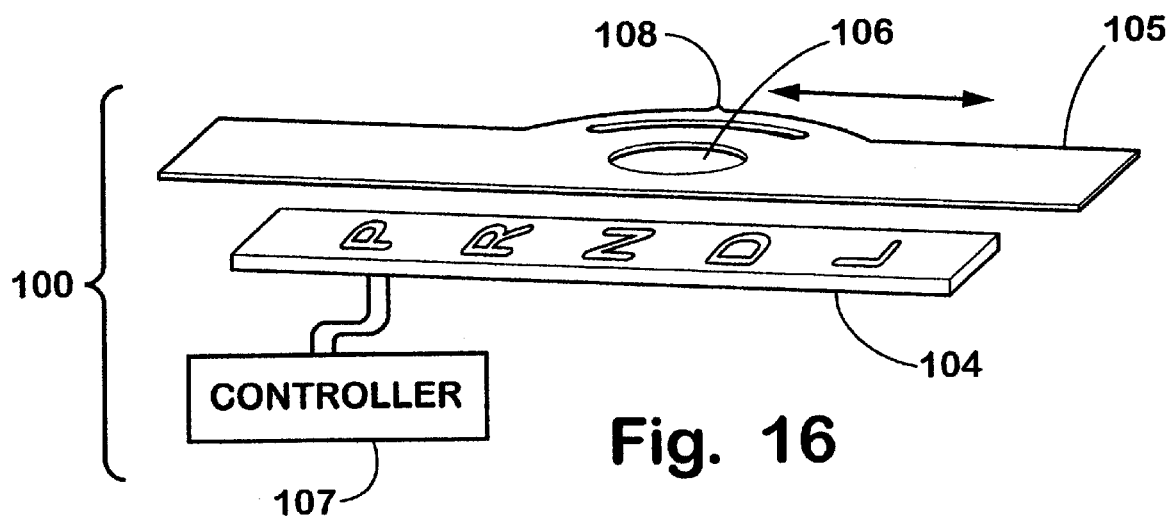
FIG. 16 is an exploded perspective view of a touch pad and slider arrangement embodying the present invention.
Figure 17:
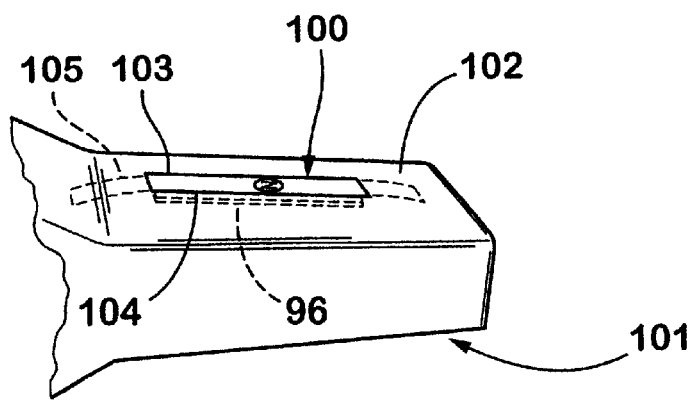
FIG. 17 is a perspective view of a console including the slide and touch pad arrangement of FIG. 16.
Figure 18:
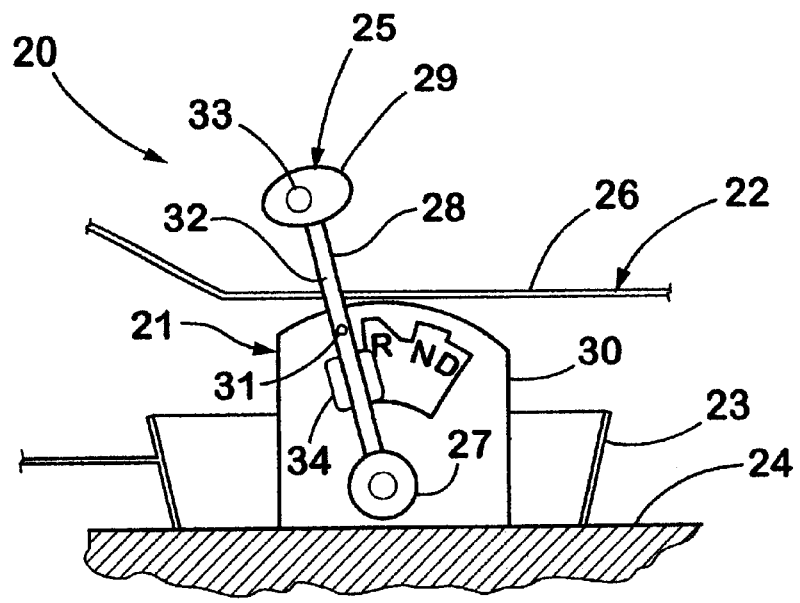
FIG. 18 is a side view of a traditional shifter having a pawl and a shift lever with a handle, the handle including a pushbutton mechanically connected to the pawl for operating the pawl and including an electromechanical interlock device.
Figure 19:
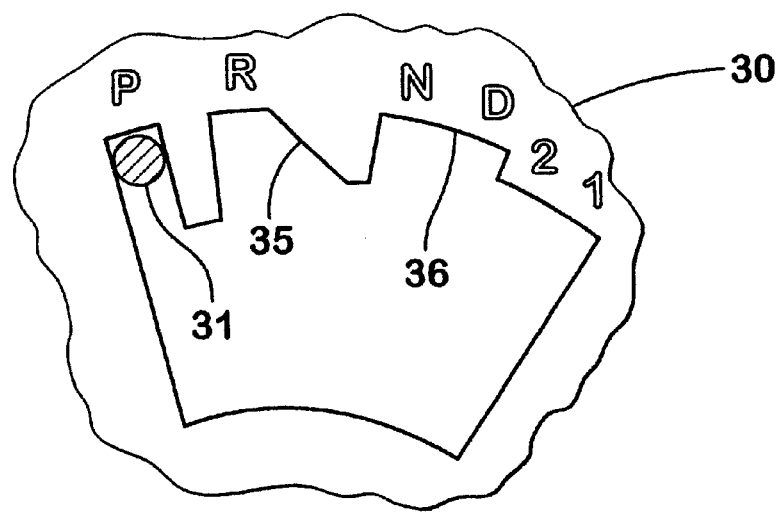
FIG. 19 is an enlarged fragmentary side view of the pawl-engaging notches for controlling movement of the shift lever of FIG. 18.

FIG. 14 shows a console 85 incorporating a shifting arrangement 86 similar to that of FIG. 2 and/or FIG. 6, but the shifting arrangement 86 includes a touch pad 87 having locations P, R, N, and D that correspond to gear positions of the transmission. It is contemplated that the touch pad 87 can define discrete positions that simulate switches at each location P, R, N, and D, or that the touch pad 87 can be continuous so that it is operated by sliding one's finger along the touch pad 87.

The slide button arrangement 90 (FIG. 15) includes a body 91 with a T-shaped slot 92 therein. Resilient flaps 93 cover the slot 92. A slide button 94 is slidable along slot 92 between gear positions P, R, N, and D. In the drive position D, the slide button 94 is movable to upshift and downshift positions indicated by the markings "+" and "−". An enabling button 95 is located in a center of slide button 94. The slide button 94 is operably connected to a potentiometer 96 or other position sensor (or a touch pad) in the body 91. The potentiometer 96 (FIG. 17) (or other position sensor) and the enabling button 95 are operably connected to a controller via a circuit similar to that shown in FIGS. 5, 5A, 7, or 8. A very advantageous feature of the slide button arrangement 90 is that an entire shift lever is replaced by a relatively small electronic component, which electronic component is positionable in various places, such as are illustrated in FIGS. 1, 3, 11, 12, and 14. Notably, an operator can locate and sense a position of the slide button 94 without having to look at the slide button 94, such that this arrangement prevents a vehicle operator from being distracted and from looking at the road while shifting. The slide button 94 can be detented to further improve the ability of a driver to know its location without looking at it. Further, the slide button arrangement 90 can include electrical or mechanical means to prevent moving the slide unless predetermined vehicle conditions are met, such as that the brake pedal is depressed, an ignition key is in the ignition switch, or the vehicle speed is below a maximum value. Notably, it is contemplated that the arrangement of FIG. 15 can be used on manual or automatic transmission shift systems.

The slide/touch pad arrangement 100 (FIGS. 16 and 17) includes a console 101 having a top 102. A modular body 103 is mounted in the top 102 and includes a touch pad 104. The touch pad 104 is electrically operably connected to a controller 107 for controlling gear positions of a transmission including P, R, N, D, and low drive "L" gear positions. For example, the touch pad 104 can be a continuous potentiometer or can be discontinuous and define discrete positions along its length. The slide tape 105 is operably mounted to the body 103 on top of the touch pad 104 for movement along the touch pad 104. The slide tape 105 includes an aperture 106 for receiving a driver's finger, and further includes resiliently supported, laterally extending protrusion 108 that selectively engages notches in top 102 that correspond to gear positions, in order to provide a detented feel indicating that the slide tape 105 is in a selected gear position. A driver shifts gears by placing his/her finger in the aperture 106 and then sliding his/her finger along the touch pad 104, moving the slide tape 105 along with his/her finger. The slide tape 105 shows a driver visually and also by feel which (gear the vehicle is in. It is contemplated that the "enabling" function can be accomplished by double clicking on the touch pad 104 or by including a second button on the top 102 (see FIG. 14, for example) or by including a movable protrusion 108 that must be manually moved to disengage from the side notches.

Modification

Figure 10:
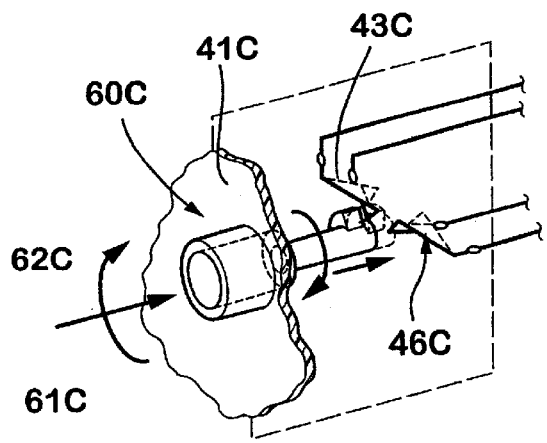
FIG. 10 is a side cross-sectional view including a modified two-motion pushbutton and a circuit associated therewith.
Figure 20:
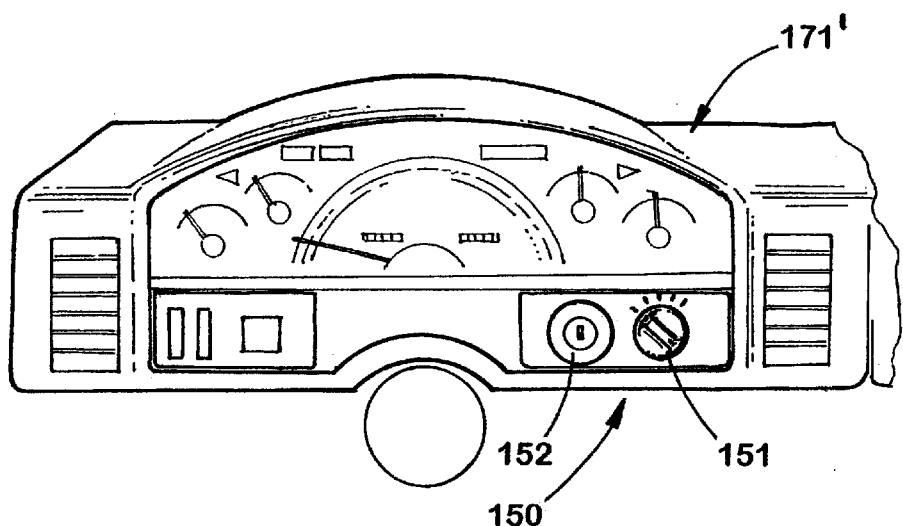
FIG. 20 is a front view of a vehicle instrument panel including a shifter-and-ignition-switch assembly embodying the present invention.
Figure 21:
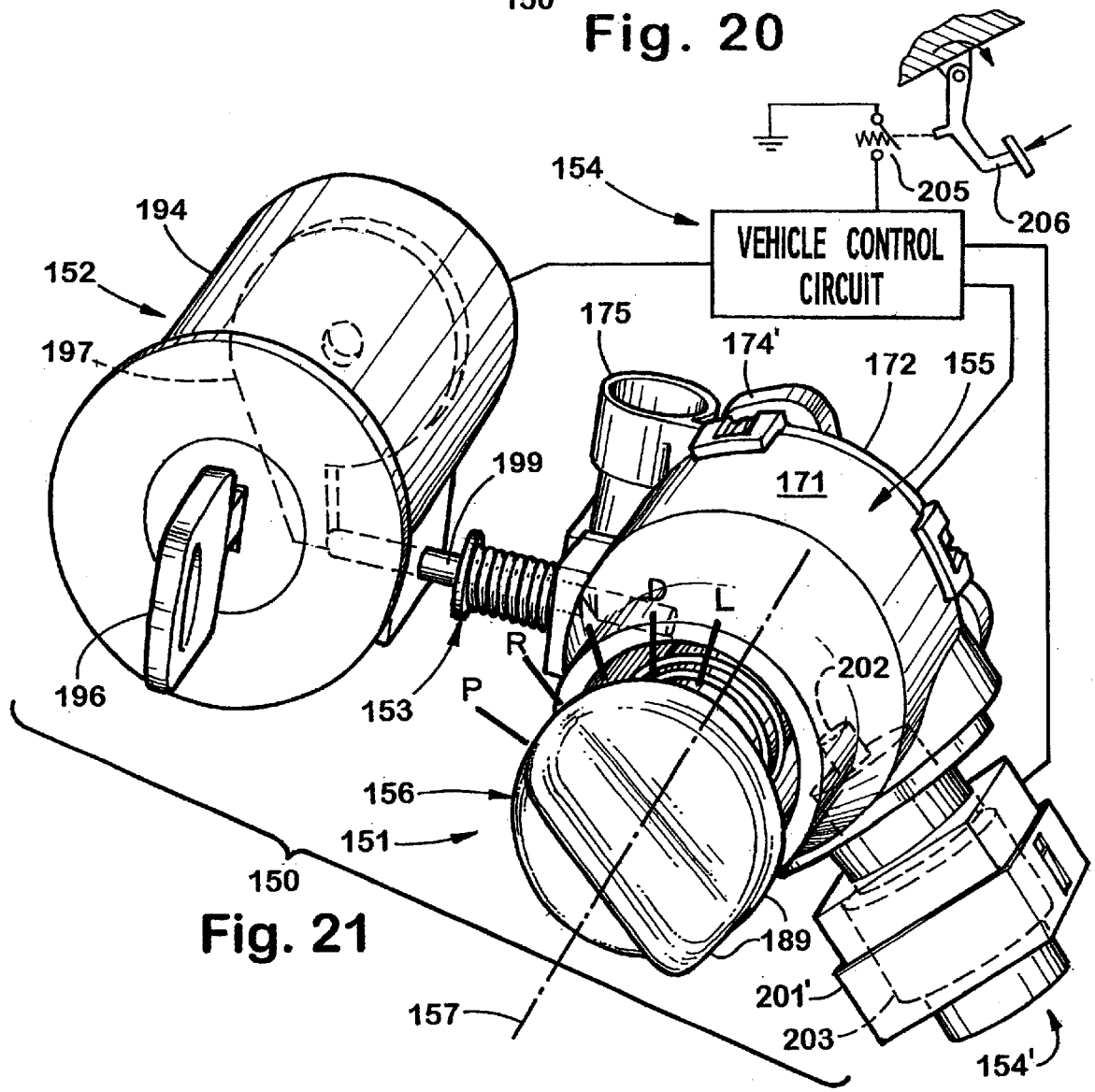
FIG. 21 is a front perspective view of the shifter-and-ignition-switch assembly shown in FIG. 20.
Figure 25:
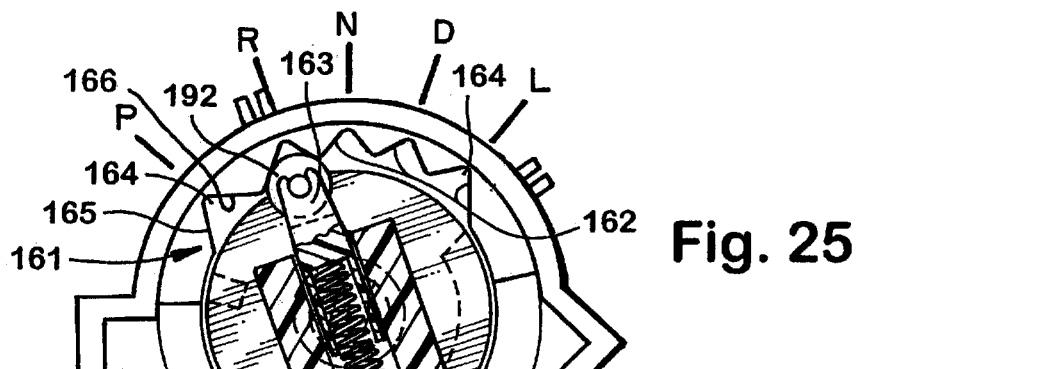
FIGS. 25 and 26 are cross sections taken along the lines XXV—XXV and XXVI—XXVI in FIG. 24.
Figure 26:
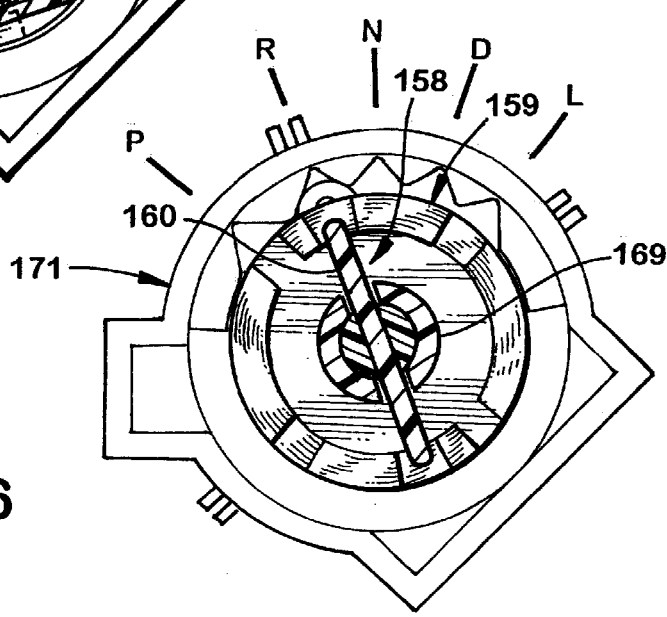
Figure 27:
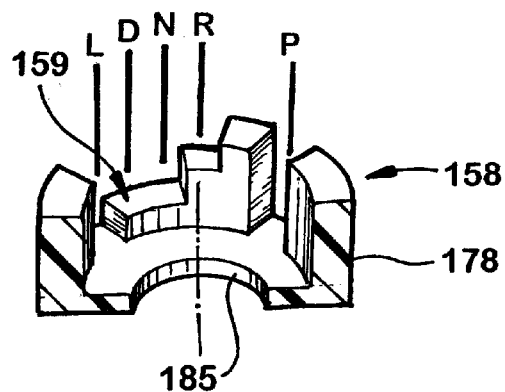
FIG. 27 is a fragmentary perspective view of the pawl-receiving notches that define gear positions on the shifter.
Figure 31:
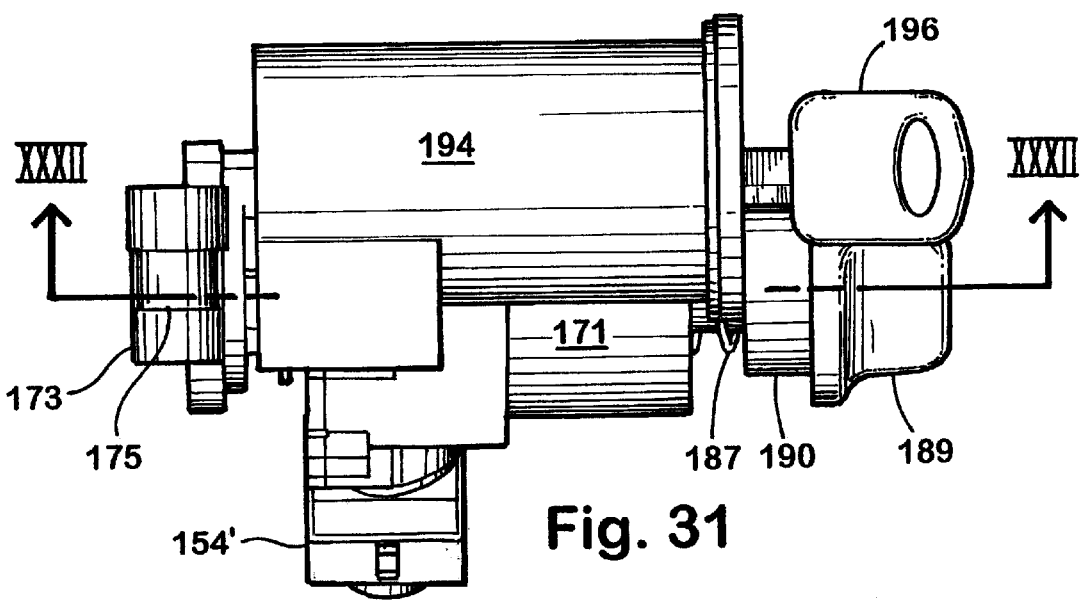
FIG. 31 is a side view of the shifter-and-ignition-switch assembly shown in FIG. 21.

A modified apparatus 150 (FIGS. 20 and 21), similar to that shown in FIG. 10, is provided for shifting a vehicle transmission. The apparatus 150 includes a miniaturized shifter 151 (FIG. 21), an ignition switch 152 coupled to the shifter by an interlock device 153, and a vehicle control circuit 154 operably connected to an electromechanical device 154' for selectively engaging the shifter to control movement of the shifter until predetermined vehicle operating conditions are met. The shifter 151 has a base 155 and has an elongated shift lever subassembly 156 rotatably mounted on the base 155 for movement between a plurality of gear positions, such as P, R, N, D, and L. The shift lever subassembly 156 is rotatable about an axis of rotation 157 that extends parallel a length of the shift lever subassembly 156. A detent device 158 (FIGS. 26 and 27) includes an irregular surface 159 defining the gear positions P, R, N, D, and L on the base 155. The detent device 158 further includes a pawl 160 on the shift lever subassembly 156 with two ends, each of which telescopingly operably engage the irregular surface 159 to prevent undesired rotational movement of the shift lever subassembly 156 between at least some of the gear positions until the pawl 160 is disengaged from the irregular surface 159. A feel positioner 161 (FIG. 25) is also provided on the apparatus 150 and includes an undulated surface 162 separate from the irregular surface 159 on the base 155, and further includes a spring-biased protrusion 163 on the shift lever subassembly 156. The undulated surface 162 has depressions 164 accurately aligned with each of the gear positions P, R, N, D, and L and enlarged opposing ramps (e.g., ramps 165 and 166) inclined toward a center of each depression 164. The spring-biased protrusion 163 operably engages the undulated surface 162 to provide a feel to a vehicle driver as the vehicle driver shifts the shift lever subassembly 156 between the gear positions P, R, N, D, and L, and further the arrangement is configured to bias the shift lever subassembly 156 toward a center of each gear position. The arrangement requires that the shift lever subassembly 156 must be manipulated by a vehicle operator both telescopingly and rotationally to select different ones of the gear positions.

Figure 24:
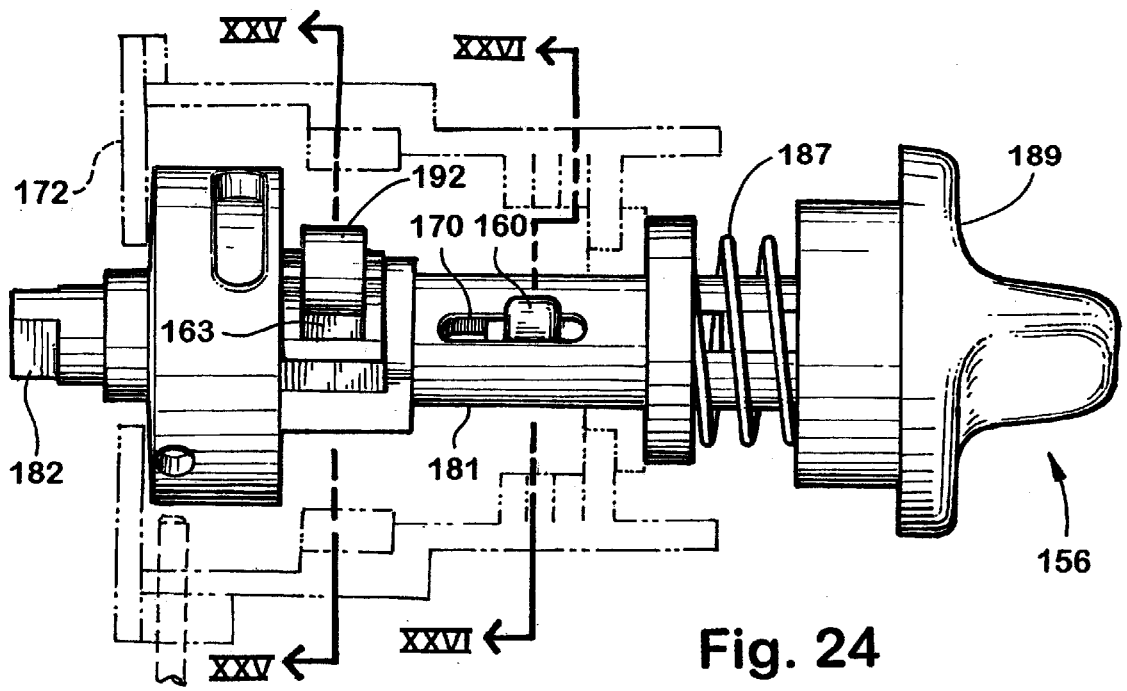
FIG. 24 is a side view of the shifter knob subassembly shown in FIG. 23.
Figure 33:
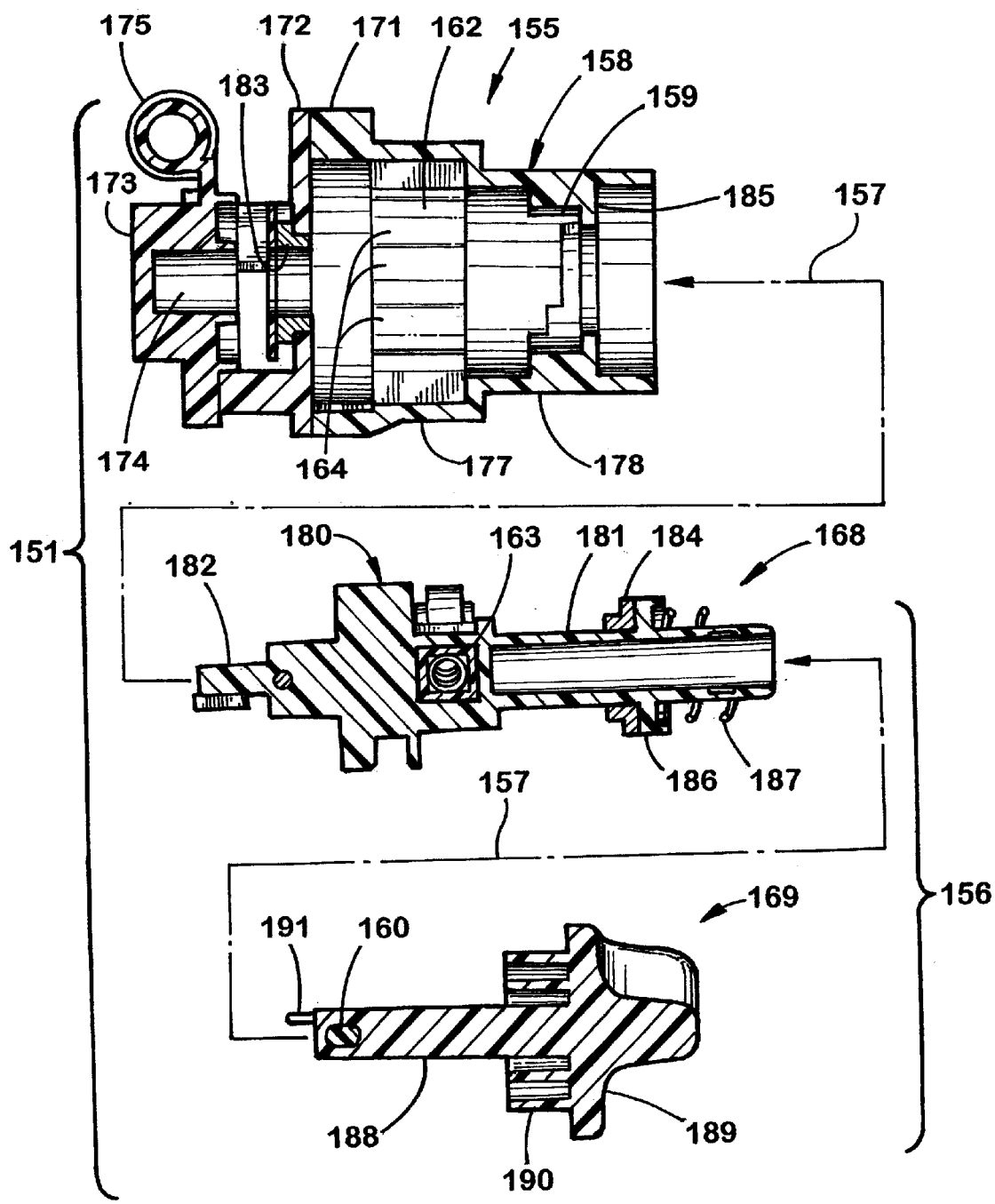
FIG. 33 is an exploded view of the shift lever subassembly in FIG. 32.

The shift lever subassembly 156 (FIG. 33) includes a lever support 168 that rotatably engages the base 155, and further includes a shift lever member 169 that telescopingly engages the lever support 168. The pawl 160 is fixed to the shift lever member 169 and extends radially through longitudinal slots 170 (FIG. 24) in the lever support 168, such that the shift lever member 169 rotates with the lever support 168 when the lever support 168 is rotated, as described below.

Figure 28:
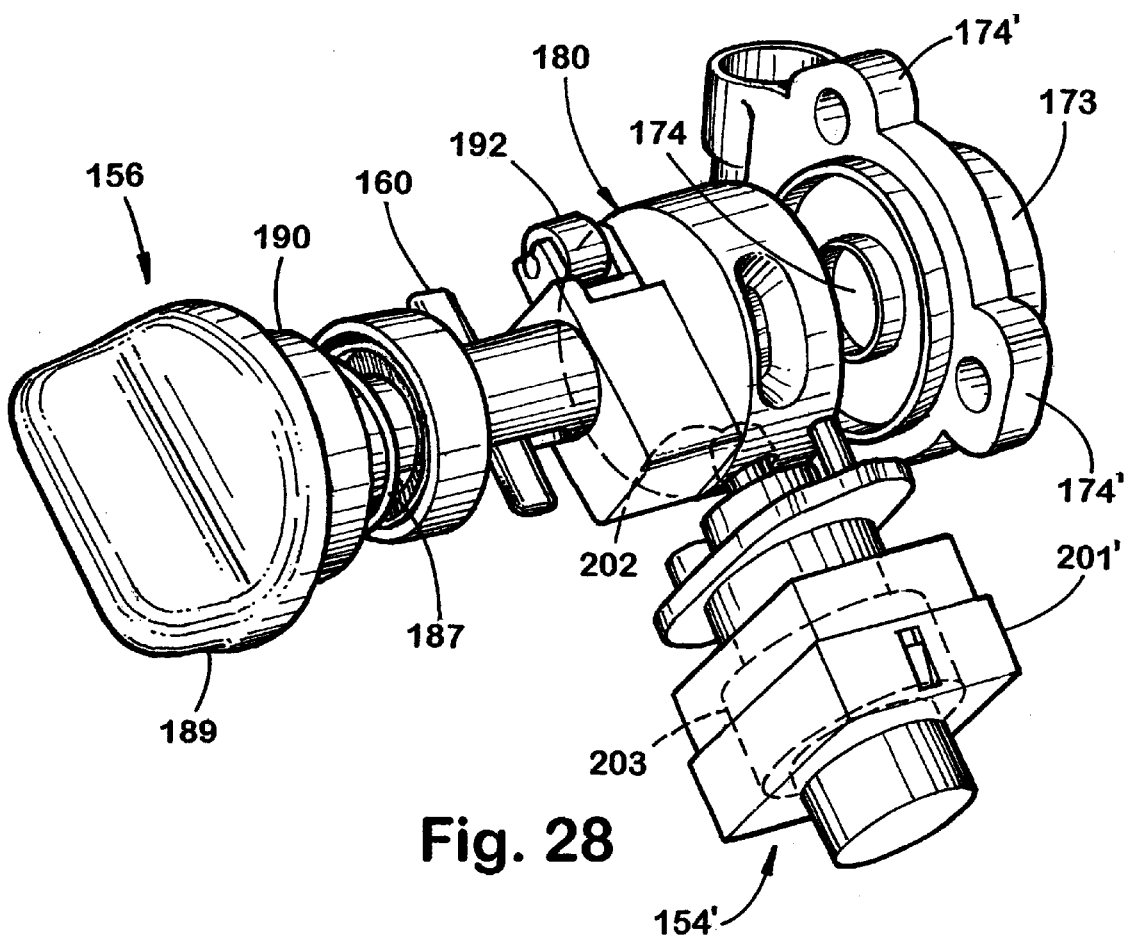
FIG. 28 is a perspective view of the shifter knob subassembly and the BITSI solenoid, the housing of the shifter knob subassembly being removed to better show internal components.
Figure 32:
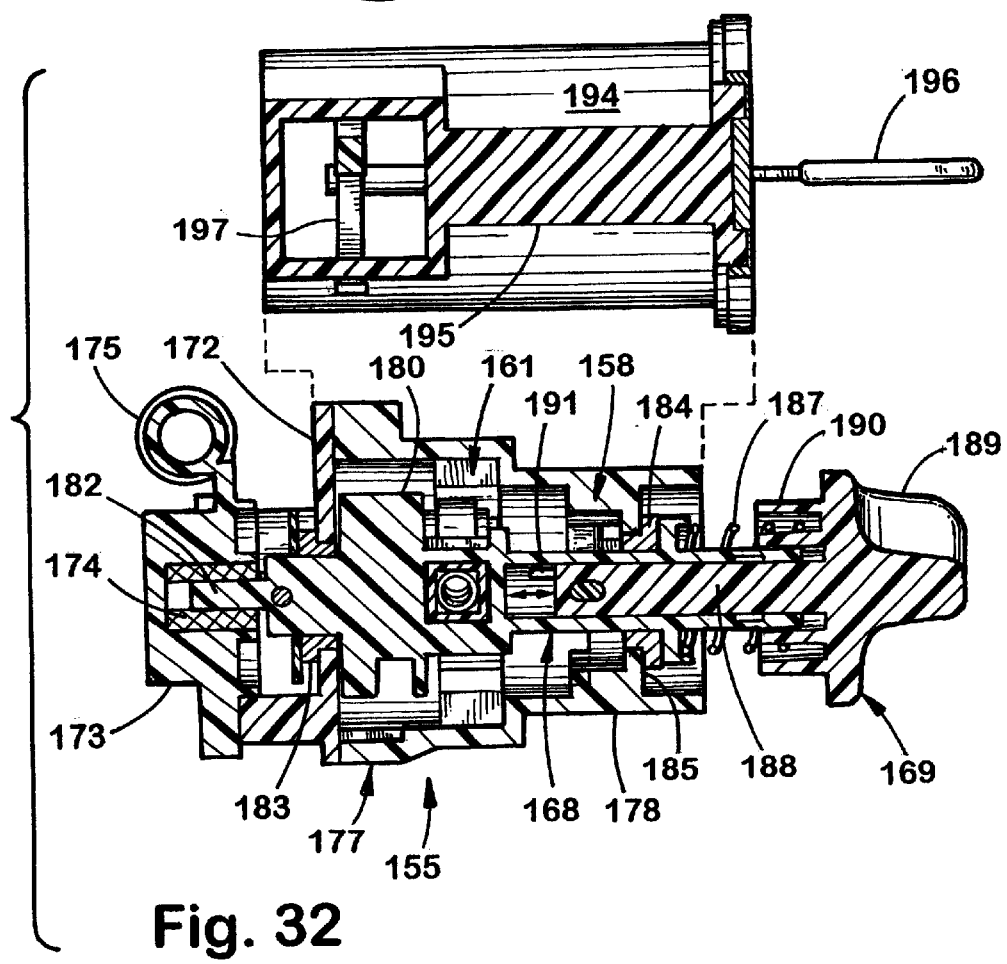
FIG. 32 is a cross-sectional view taken along the line XXXI—XXXI in FIG. 31.

The base 155 (FIG. 21) includes a housing 171 configured for secure attachment to a vehicle instrument panel, such as instrument panel 171' (FIG. 20), and further includes an end piece 172 (FIG. 30) snap attached to the housing 171 to substantially close the cavity within the housing 171. A bottom piece 173 is attached to the housing 171 and the end piece 172. The bottom piece 173 includes apertured flanges 174' (FIG. 28) with holes for receiving attachment screws for securement to the bottom of housing 171. The bottom piece 173 has a hollow body configured to bold a potentiometer 174 (FIG. 32) at an end of the cavity within housing 171, as described below. A wire holding flange 175 (FIG. 21) is integrated into the bottom piece 173, for holding wires that extend from the potentiometer 174.

The housing 171 of base 155 (FIG. 33) has a first section 177 with the undulated surface 162 formed integrally on its inner surface, and has a second section 178 with the irregular surface 159 formed integrally on its inner surface. The surfaces 159 and 162 are formed as separate surfaces and are spaced apart so that each surface 159 and 162 can be independently formed for optimal performance.

The shift lever support 168 (FIG. 33) includes an elongated body with an enlarged section 180 and a tube-shaped second section 181. The enlarged section 180 includes a finger 182 with a flat or keyed surface thereon that is shaped to mateably engage the potentiometer 174, such that the potentiometer 174 rotates when the shift lever support 168 is rotated. The base of the finger 182 engages a first bearing 183 in the end piece 172 to rotatably support that end of the shift lever support 168, and an intermediate portion of the tube-shaped second section 181 engages a second bearing 184 supported in the housing 171 at annular inner wall 185. A radially extending flange 186 on the tube-shaped second section 181 engages the bearing 184. A coil spring 187 is positioned against the flange 186 and extends in an opposite direction.

The shift lever member 169 (FIG. 33) includes an elongated rod-shaped section 188 configured to telescopingly fit within the tube-shaped second section 181 if the lever support 168. A handle 189 extends from the rod-shaped section 188. The handle 189 has side surfaces that slope together so that they are configured to receive a vehicle operator's thumb and first finger for easy grasping and rotating of the shift lever member 169. Circumferential flanges 190 are formed under the handle 189 for capturing and hiding the outer end of the spring 187. The length of the flanges 190 and/or the length of the axially extending stopper 191 (at an end of the rod-shaped section 188) are shaped to engage abutting structure on the housing 171 to form a stop arrangement that limits the telescoping movement of the shift lever member 169 on the lever support 168.

During assembly of the shift lever member 169 to the shift lever support 168, the shift lever member 169 is extended into the shift lever support 168 with the spring 187 in place on the shift lever member 169. Once in position, the pawl 160 is extended through a side of the housing 171 and press-fit into a hole in the rod-shaped section 188 of the shift lever member 169. Once released, the spring 187 biases the pawl 160 telescopingly into engagement with the notches in the irregular surface 159. The presence of pawl 160 prevents the shift lever member 169 from being removed from within the shift lever support 168. The notches are shaped to prevent rotation of the shift lever subassembly 156 in predetermined gears until the shift lever member 169 is telescopingly depressed. For example, the notch corresponding to the park position P prevents the shift lever member 169 from being rotated until the pawl 160 is disengaged from this notch. Also for example, the pawl 160 engages the notch corresponding to neutral position N in a way that prevents accidentally shifting into reverse position R, but it allows rotation from neutral position N into drive position D without telescopingly depressing the shift lever member 169. The reasons for the shapes of different notches are well known in the art in traditional shifters, such that further explanation of the present notched shapes is not necessary for an understanding of the present invention. A roller 192 (FIGS. 25 and 28) is positioned on an end of the spring-biased protrusion 163 for rollingly engaging the depressions of the undulated surface 162. This provides a smoother feel to an operator when rotating the shift lever subassembly 156 than merely using a slide block, although slide blocks are contemplated to be within a scope of the present invention. This smooth feel can be very important to customer satisfaction, since any non-uniform friction not only gives the customer a poor opinion of the quality of the vehicle, but also it may be interpreted by a customer as a warranty problem.

Potentiometers are well known in industry and a detailed description herein is not believed to be necessary. The illustrated potentiometer 174 is a continuous output type potentiometer, but it is contemplated that different types can be used, and that sensors (e.g. Hall effect sensors) could be used if desired. The potentiometer 174 is connected to the vehicle control circuit 154 and permits a "shift-by-wire" arrangement that shifts the vehicle by electronic controls.

Figure 22:
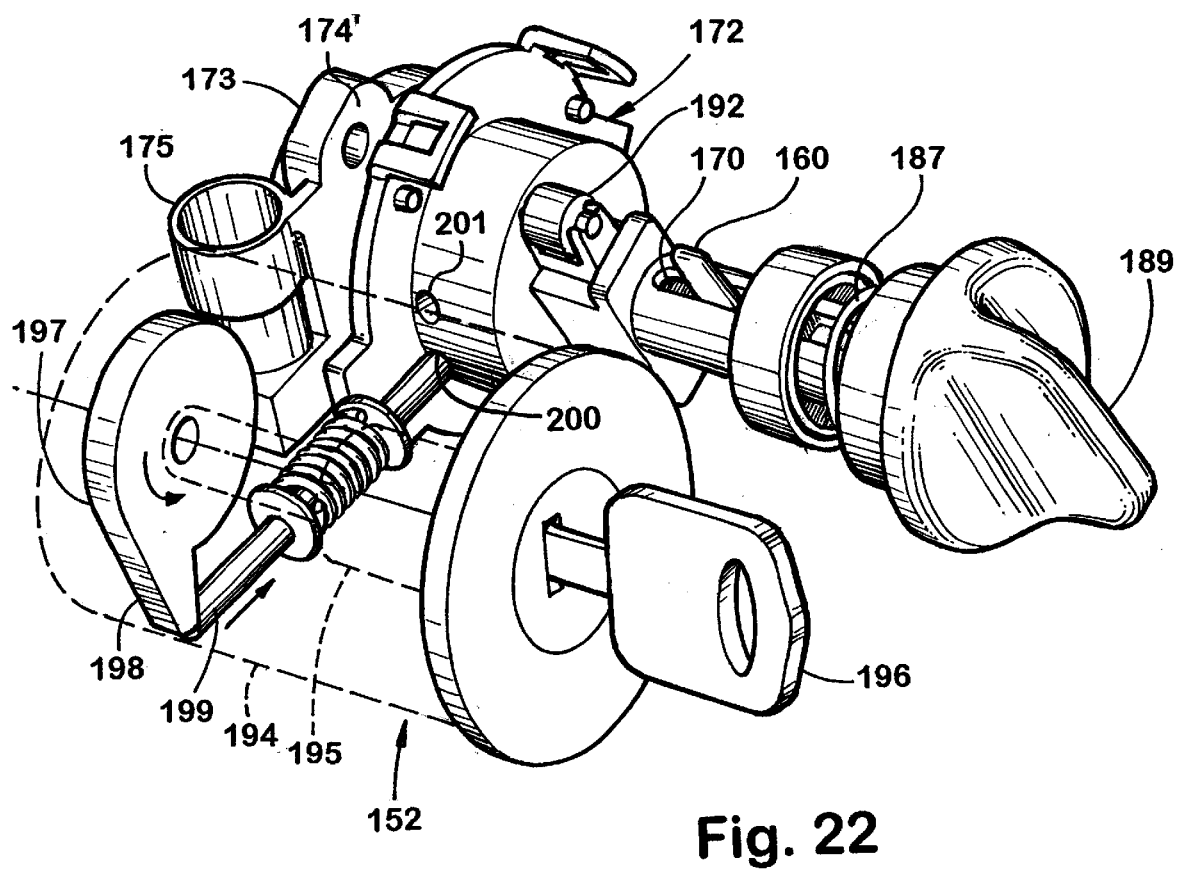
FIG. 22 is a another front perspective view of the shifter-and-ignition-switch assembly shown in FIG. 21, the housings of the shifter and of the ignition switch being removed to better show internal components.
Figure 23:
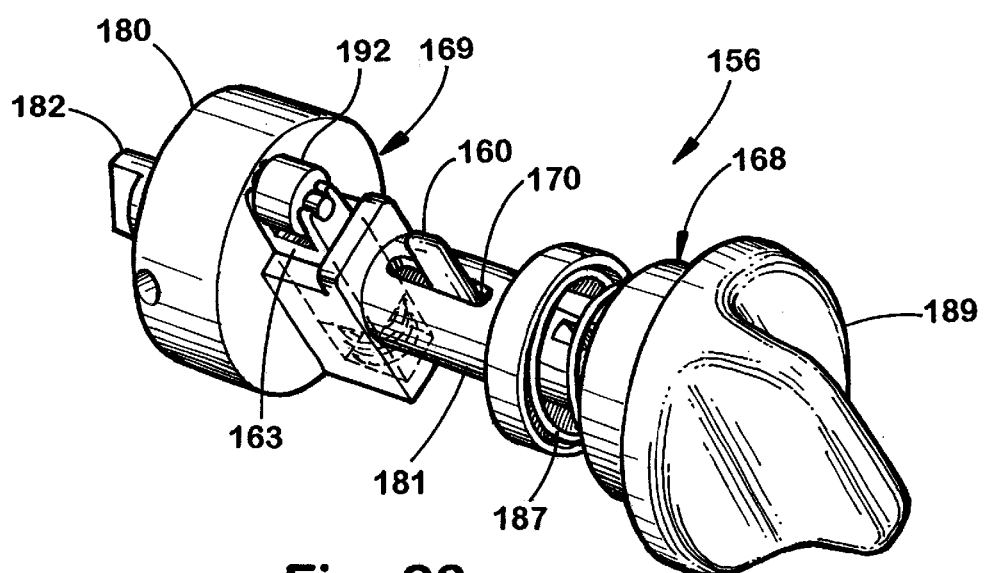
FIG. 23 is a perspective view of the shifter knob subassembly shown in FIG. 21.

The ignition switch 152 (FIG. 22) includes an ignition switch housing 194 attached to (or integrally molded as part of) the base 155. A lock tumbler 195 is positioned within the ignition switch housing 194 for operably receiving an ignition key 196. Vehicle ignition switches, lock tumblers, and keys for engaging the same are well known in the art. A cam 197 includes a radially extending finger 198 constructed to extend a spring-biased rod 199 when the ignition switch tumbler 195 is rotated to an "on" position. The rod 199 extends through the ignition switch housing 194 and into the shifter housing 171. The enlarged section 180 of the shift lever support 168 includes a hole 200 (and potentially a second hole 201) shaped to receive the end of the rod 199. The hole 200 corresponds to the park position P and prevents the ignition key 196 from being removed unless the shift lever subassembly 156 is in the park position P. The hole 201 corresponds to the neutral position N and prevents the ignition key 196 from being removed unless the shift lever subassembly 156 is in the neutral position N.

An electromechanical interlock device 153 (FIG. 21) is attached to the shifter 151. The interlock device 154' includes a housing 201', and an extendable rod 202 operably connected to a solenoid 203 held within the housing 201'. A rod 202 is located to extend into a hole in the shifter housing 171 and into a hole in the shift lever support 168. In the extended position, the rod 202 prevents the shift lever subassembly 156 from being rotated out of the park position P. It is contemplated that an electromagnetic coil or the like can be used in place of a solenoid if desired. The solenoid 203 is connected to the vehicle control circuit 154. The vehicle control circuit 154 is further connected to other vehicle sensors and switches, such as the illustrated switch 205 that closes when the brake pedal 206 is depressed. The vehicle control circuit 154 is programmed to extend the rod 202 until predetermined vehicle conditions are met. For example, the control circuit 154 can be programmed to extend the rod 202 until the brake pedal 206 is depressed and the brake switch 205 is closed. Thus, the vehicle shifter 151 cannot be shifted out of park position P until the vehicle operator depresses the brake pedal 206. This is a safety feature desired by manufacturers and required by the statutes of many countries. Notably, the present arrangement is very durable and secure, such that the shifter subassembly 156 cannot be forcibly rotated even though the present components are miniaturized.

In the foregoing description, persons skilled in the art will readily appreciate that modifications may be made to the invention without departing from the concepts disclosed herein. Such modifications are to be considered as included in the following claims, unless these claims by their language expressly state otherwise.

The invention claimed is:

1. A shifter for shifting a vehicle transmission, comprising:

a base adapted for attachment to a vehicle;

an elongated shift lever subassembly rotatably mounted on the base for movement between a plurality of gear positions about an axis of rotation that extends parallel a length of the shift lever subassembly, the shift lever subassembly including a handle in-line with the axis that is rotatable with a dialing motion;

a detent device including an irregular surface with notches corresponding to the gear positions on one of the base and the shift lever subassembly, and including a first protrusion on the other of the base and the shift lever subassembly, the first protrusion operably engaging the irregular surface so as to physically prevent undesired rotational movement of the shift lever subassembly between at least some of the gear positions until the first protrusion is axially moved and disengaged from the irregular surface; and a feel positioner device including an undulated surface separate from the irregular surface on one of the base and the shift lever assembly, and including a second protrusion on the other of the base and the shift lever subassembly, the undulated surface having depressions accurately aligned with each of the gear positions and further having well-defined opposing ramps inclined toward a center of each depression, the second protrusion operably engaging the undulated surface to provide a feel to a vehicle driver as the vehicle driver shifts the shift lever subassembly between gear positions and further being configured to bias the shift lever subassembly toward a center of each gear position.

2. The shifter defined in claim 1, including a potentiometer operably coupled to the base and the shift lever subassembly that generates a signal corresponding to an angular position of the shift lever subassembly, whereby a vehicle control circuit connected to the potentiometer can use the signal to shift the vehicle transmission.

3. The shifter defined in claim 1, including an ignition switch and a mechanical interlock device interconnecting the ignition switch and the shift lever subassembly, the mechanical interlock device being movable to an extended position when the ignition switch is in a key-released position whereby the shift lever subassembly cannot be rotated from a predetermined one of the gear positions, and being movable to a retracted position when the ignition switch is in an ignition-on, key-retained position whereby the shift lever subassembly can be rotated.

4. The shifter defined in claim 1, wherein the shift lever subassembly includes a lever support that rotatably engages the base, and further includes a shift lever member that telescopingly engages the lever support, and wherein the first protrusion is a pawl on the shift lever member that operably engages the notches of the irregular surface.

5. The shifter defined in claim 1, wherein the second protrusion on the feel positioner includes a roller that rollingly engages the undulated surface.

6. The shifter defined in claim 1, including an electromechanical park lock device attached to the base and an aperture on the shift lever subassembly, the electromechanical park lock device including an extendable pin that is extendable into the aperture when the electromechanical device is actuated to prevent the shift lever subassembly from being rotated.

7. The shifter defined in claim 1, wherein the handle is miniaturized and is shaped to receive an operator's fingers for dialing movement.

8. The shifter defined in claim 2, including a controller connected to the potentiometer that is programmed and adapted to shift the vehicle transmission.

9. The shifter defined in claim 4, wherein the shift lever member includes a projection engaging mating structure on the lever support that acts as a stop to limit telescoping movement of the shift lever member on the lever support.

10. The shifter defined in claim 4, including a spring biasing the shift lever member telescopingly outwardly from the lever support toward an extended position.

11. The shifter defined in claim 4, wherein the lever support includes a tubular section, and wherein the shift lever member includes a rod section matingly, telescopingly engaging the tubular section.

12. The shifter defined in claim 4, wherein the irregular surface defines an open area permitting the pawl to completely disengage the notches, the pawl being moved to the open area when the shift lever member is depressed fully into the lever support and when in the open area permitting the shift lever member to be moved to any of the gear positions.

13. The shifter defined in claim 8, including a gear-position interlock device on one of the base and the shift lever subassembly for holding the shift lever subassembly in a predetermined gear position until predetermined vehicle conditions are met as determined by the control circuit, the interlock device including an electromechanical coil operably connected to the vehicle control circuit, and further including an extendable pin operably associated with the electromagnetic coil and the extendable pin to interlockingly hold the shift lever subassembly in a fixed position relative to the base when extended, but releasing the shift lever subassembly when retracted and disengaged.

14. The shifter defined in claim 13, including an ignition switch and a mechanical interlock device interconnecting the ignition switch and the shift lever subassembly, the mechanical interlock device being movable to an extended position when the ignition switch is in a key-released position whereby the shift lever subassembly cannot be rotated from a predetermined one of the gear positions, and being movable to a retracted position when the ignition switch is in an ignition-on, key-retained position whereby the shift lever subassembly can be rotated.

15. A shifter for shifting a vehicle transmission, comprising:
a base defining an axis of rotation and having a circumferentially extending surface with radially extending notches therein defining a plurality of gear positions; and
a shift lever subassembly including a lever support that extends parallel a length of the axis and that rotatably engages the base for rotation about the axis, and further including a shift lever member that telescopingly engages the lever support but that is coupled to the lever support for rotation with the lever support, the shift lever member including a pawl that extends radially from the shift lever member into engagement with the notches and including a spring that telescopingly biases the shift lever member so as to cause the pawl to move into engagement with the notches, the pawl positively engaging the notches to prevent undesired rotational movement of the shift lever subassembly but the shift lever member being telescopingly movable on the lever support against a bias of the spring to disengage the pawl from the notches, whereby the shift lever subassembly must be manipulated by a vehicle operator both telescopingly and rotationally to select different ones of the gear positions.

16. The shifter defined in claim 15, wherein the lever support includes a tubular section, and wherein the shift lever member includes a rod section matingly, telescopingly engaging the tubular section.

17. The shifter defined in claim 16, wherein the circumferentially extending surface defines an open area permitting the pawl to completely disengage the notches, the pawl being moved to the open area when the shift lever member is depressed fully into the lever support and when in the open area permitting the shift lever member to be moved to any of the gear positions.

18. An apparatus for shifting a vehicle transmission, comprising:
a shifter including a base defining an axis of rotation and an elongated shift lever subassembly that extends parallel the axis and that is rotatably mounted on the base for movement between a plurality of gear positions, the shift lever subassembly including a miniaturized knob in-line with the axis of rotation that is shaped to receive a person's fingers for rotational manipulation and further including a radially extending aperture;
a detent device including an irregular surface with notches corresponding to the plurality of gear positions on one of the base and the shift lever subassembly, and a first protrusion on the other of the base and the shift lever subassembly, the first protrusion operably engaging the irregular surface to prevent undesired rotational movement of the shift lever subassembly between at least some of the gear positions;

an ignition switch attached to the base that is movable between an ignition-on, key-retained position and a key-released position; and an ignition switch interlock device including an extendable pin configured to extend into the aperture to prevent undesired rotation of the shift lever subassembly when the ignition switch is in the key-released position, and to retract from the aperture when the ignition switch is in the ignition-on, key-retained position.

19. An apparatus adapted to function with a vehicle control circuit for shifting a vehicle transmission, comprising:

a shifter including a base and a shift lever subassembly rotatably mounted on the base for movement about an axis of rotation between a plurality of gear positions, the shift lever subassembly including a miniaturized knob positioned in-line with the axis of rotation and that is shaped to receive a person's fingers for rotational manipulation, and further including an enlarged section that rotates with the knob, the enlarged section including an aperture;

a detent device including an irregular surface with notches corresponding to the plurality of gear positions on one of the base and the shift lever subassembly, and a first protrusion on the other of the base and the shift lever subassembly, the first protrusion operably engaging the irregular surface to prevent undesired rotational movement of the shift lever subassembly between at least some of the gear positions; and an electromechanical interlock device including an electromagnetic coil adapted for connection to the vehicle control circuit and including an extendable pin operably associated with the electromagnetic coil, the extendable pin being normally retracted and disengaged from the aperture but being configured to extend into the aperture when the shift lever subassembly is in a predetermined one of the gear positions and when the vehicle control circuit actuates the electromagnetic coil, the pin, when extended, preventing the shift lever subassembly from being moved from the one gear position until the vehicle control circuit retracts the pin and allows the shift lever subassembly to be rotated.

20. A shifter for connection to an electrical control circuit for shifting a transmission of a passenger vehicle, the passenger vehicle including a passenger compartment and including an instrument panel in the passenger compartment, the instrument panel having dense arrangements of instruments, gages, and controls mounted to structure in the instrument panel, comprising:

a miniaturized shifter including a base configured to be positioned in and supported in a compact space within and by a vehicle instrument panel, and including a miniaturized subassembly rotatably mounted to the base and that includes an aperture, the miniaturized shifter being characteristically small in size such that a vehicle operator can only operate the miniaturized shifter with the operator's fingers and not with a palm or other body part; and an interlock device including an electromechanical device adapted for connection to a vehicle control circuit, the electromechanical device including an extendable pin that is configured to move between a locking position where the extendable pin engages the aperture in the miniaturized subassembly to prevent rotational movement until predetermined vehicle conditions are met and the vehicle control circuit actuates the electromechanical device, and to move to an unlocked position where the extendable pin disengages from the miniaturized shifter to allow shifting by the operator.

21. A shifter for connection to an electrical control circuit for shifting a transmission of a passenger vehicle, the transmission being shiftable between different gears, comprising:

a shifter including a base adapted for attachment to a vehicle, and including a driver interface device movably mounted to the base for movement between a plurality of gear positions corresponding to the different gears, the gear positions including a park gear position and at least one non-park gear position, the shifter including a sensor arrangement constructed to output an electrical signal indicative of a selected position of the driver interface device, the sensor arrangement being adapted for attachment to the electrical control circuit and the shifter characteristically not adapted for mechanical connection to the transmission for shifting the transmission; and an interlock device including an electromechanical device adapted for connection to a vehicle control circuit, the electromechanical device being operably coupled to the shifter and including an extendable pin that is configured to move between a locking position where the extendable pin engages the driver interface device to prevent movement from the non-park gear position to the park gear position until predetermined vehicle conditions are met and until the control circuit actuates the electromechanical device, and to move to an unlocked position where the extendable pin disengages from the driver interface device to allow shifting by a vehicle operator, the shifter includes an enlarged section having a first hole corresponding to the park gear position and a second hole corresponding to the non-park gear position, and wherein the electromechanical device includes an extendable pin having an end selectively engageable with the first hole and the second hole.

22. A shifter for connection to an electrical control circuit for shifting a transmission of a passenger vehicle, the transmission being shiftable between different gears, comprising:

a shifter including a base adapted for attachment to a vehicle, and including a driver interface device movably mounted to the base for movement between a plurality of gear positions corresponding to the different gears, the gear positions including a park gear position and at least one non-park gear position, the shifter including a sensor arrangement constructed to output an electrical signal indicative of a selected position of the driver interface device, the sensor arrangement being adapted for attachment to the electrical control circuit and the shifter characteristically not adapted for mechanical connection to the transmission for shifting the transmission; and an interlock device including an electromechanical device adapted for connection to a vehicle control circuit, the electromechanical device being operably coupled to the shifter and including an extendable pin that is configured to move between a locking position where the extendable pin engages the driver interface device to prevent movement from the non-park gear position to the park gear position until predetermined vehicle conditions are met and until the control circuit actuates the electromechanical device, and to move to an unlocked position where the extendable pin disengages from the driver interface device to allow shifting by a vehicle operator.

23. The shifter defined in claim 22, wherein the driver interface device includes a shift lever.

24. The shifter defined in claim 22, wherein the driver interface device is miniaturized and is rotatable.

* * * * *